United States Patent
Wang et al.

(10) Patent No.: US 10,228,606 B2
(45) Date of Patent: Mar. 12, 2019

(54) DISPLAY PANEL COMPRISING LIQUID CRYSTAL MOLECULES THAT ARE DRIVEN TO CREATE A RIGHT-ANGLE LIQUID CRYSTAL PRISM AND DISPLAY APPARATUS AND DRIVING METHOD THEREOF

(71) Applicants: BOE TECHNOLOGY GROUP CO., LTD., Beijing (CN); Beijing BOE Optoelectronics Technology Co., Ltd., Beijing (CN)

(72) Inventors: Lei Wang, Beijing (CN); Xiaochuan Chen, Beijing (CN); Rui Xu, Beijing (CN); Wenqing Zhao, Beijing (CN); Ming Yang, Beijing (CN); Qian Wang, Beijing (CN); Pengcheng Lu, Beijing (CN); Jian Gao, Beijing (CN); Xiaochen Niu, Beijing (CN); Yingming Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/534,326

(22) PCT Filed: Sep. 9, 2016

(86) PCT No.: PCT/CN2016/098502
§ 371 (c)(1),
(2) Date: Jun. 8, 2017

(87) PCT Pub. No.: WO2017/166732
PCT Pub. Date: Oct. 5, 2017

(65) Prior Publication Data
US 2018/0107088 A1    Apr. 19, 2018

(30) Foreign Application Priority Data

Apr. 1, 2016 (CN) .......................... 2016 1 0203447

(51) Int. Cl.
*G02F 1/29* (2006.01)
*G02F 1/1333* (2006.01)

(52) U.S. Cl.
CPC .............. *G02F 1/29* (2013.01); *G02F 1/1333* (2013.01); *G02F 2203/24* (2013.01)

(58) Field of Classification Search
CPC .............................. G02F 1/29; G02F 2203/24
See application file for complete search history.

(56) References Cited

U.S. PATENT DOCUMENTS

| 8,937,700 B2 | 1/2015 | Nishida et al. |
| 9,678,388 B2 | 6/2017 | Takatori |

(Continued)

FOREIGN PATENT DOCUMENTS

| CN | 101498871 A | 8/2009 |
| CN | 102081270 A | 6/2011 |

(Continued)

OTHER PUBLICATIONS

International Search Report dated Dec. 29, 2016 in corresponding International Application No. PCT/CN2016/098502 along with an English translation of the International Search Report and an English translation of the Written Opinion of the International Searching Authority.

(Continued)

*Primary Examiner* — Paul C Lee
(74) *Attorney, Agent, or Firm* — Nath, Goldbeerg & Meyer; Joshua B. Goldberg; Daniel Bissing

(57) ABSTRACT

The present disclosure provides a display panel, a driving method thereof and a display apparatus. The display panel includes display areas arranged in array, each display area (Continued)

including at least two pixels having different domain tilt directions and strip electrodes in the pixels having different tilt directions. The pixels having different domain tilt directions in each display area are electrically connected with different gate lines, and the pixels in each display area are electrically connected with a same data line. Each pixel is configured to drive, under a control of the gate line electrically connected with the pixel, liquid crystal molecules in the pixel to create a corresponding liquid crystal prism according to amplitude of data voltage input through the data line, so as to control light emergent direction at a position where the pixel is located. The display panel is capable of performing single or multiple view display.

20 Claims, 3 Drawing Sheets

(56) References Cited

U.S. PATENT DOCUMENTS

| | | | |
|---|---|---|---|
| 9,806,101 B2 | 10/2017 | Wu et al. | |
| 9,891,481 B2 | 2/2018 | Yang et al. | |
| 2005/0041174 A1* | 2/2005 | Numata | G02B 6/0053 |
| | | | 349/61 |
| 2012/0013825 A1 | 1/2012 | Sugiura et al. | |
| 2013/0188106 A1* | 7/2013 | Nishida | G02F 1/133512 |
| | | | 349/33 |
| 2014/0176835 A1* | 6/2014 | Hayashi | G02F 1/133504 |
| | | | 349/15 |
| 2015/0146115 A1* | 5/2015 | Liao | H04N 13/0404 |
| | | | 349/15 |
| 2016/0357070 A1 | 12/2016 | Yang et al. | |
| 2016/0357073 A1 | 12/2016 | Zhang et al. | |
| 2017/0059959 A1* | 3/2017 | Wu | G02B 27/2214 |
| 2017/0061838 A1* | 3/2017 | Shi | G02B 5/30 |
| 2018/0081208 A1* | 3/2018 | Zhao | G09G 3/3696 |

FOREIGN PATENT DOCUMENTS

| | | |
|---|---|---|
| CN | 102636895 A | 8/2012 |
| CN | 103135293 A | 6/2013 |
| CN | 103185993 A | 7/2013 |
| CN | 103487983 A | 1/2014 |
| CN | 104181735 A | 12/2014 |
| CN | 204302633 U | 4/2015 |
| CN | 104597675 A | 5/2015 |
| CN | 104834142 A | 8/2015 |
| CN | 105045013 A | 11/2015 |
| CN | 105676511 A | 6/2016 |

OTHER PUBLICATIONS

First Office Action dated May 3, 2018 in corresponding Chinese Patent Application No. 201610203447.8.

* cited by examiner

DISPLAY PANEL COMPRISING LIQUID CRYSTAL MOLECULES THAT ARE DRIVEN TO CREATE A RIGHT-ANGLE LIQUID CRYSTAL PRISM AND DISPLAY APPARATUS AND DRIVING METHOD THEREOF

This is a National Phase Application filed under 35 U.S.C. 371 as a national stage of PCT/CN2016/098502, filed Sep. 9, 2016, an application claiming the benefit of Chinese Application No. 201610203447.8, filed Apr. 1, 2016, the content of each of which is hereby incorporated by reference in its entirety.

FIELD

The present disclosure relates to the field of display technology, and particularly relates to a display panel, a driving method thereof, and a display apparatus.

BACKGROUND

With the progress of science and technology, conventional single-domain liquid crystal display apparatus cannot meet people's demands on liquid crystal display apparatuses due to its disadvantages of low contrast ratio, asymmetric view angle, color shift when viewing displayed images at different angles and the like. A full-view polarizer with compensation function may be adopted to mitigate the color shift effect of the single-domain liquid crystal display apparatus.

In the prior art, a 2P2D pixel structure design (i.e., dual-domain liquid crystal display) has been employed in the liquid crystal display apparatus, so that the color shift effect can be mitigated. However, for existing 2D PD pixel structure design, although there are two types of strip electrodes having different domain tilt directions in each display area, only single view display can be achieved. In addition, the light emergent direction of the liquid crystal display apparatus is not fixed, resulting in less privacy for displayed images.

SUMMARY

To solve at least the above problems existing in multi-domain display panel, the present disclosure provides a display panel, a driving method thereof and a display apparatus capable of realizing fixed view angle, single view display and multiple view display.

An embodiment of the present disclosure provides a display panel including a plurality of display areas arranged in form of an array, each display area including at least two pixels having different domain tilt directions, and strip electrodes in the pixels having different domain tilt directions having different tilt directions, wherein the pixels having different domain tilt directions in each display area are electrically connected with different gate lines, and the pixels in each display area are electrically connected with a same data line, and each pixel is configured to drive, under a control of the gate line electrically connected with the pixel, liquid crystal molecules in the pixel to create a corresponding liquid crystal prism according to amplitude of data voltage input through the data line, so as to control light emergent direction at a position where the pixel is located.

Optionally, the pixels in each display area include a first pixel and a second pixel having different domain tilt directions, and the gate lines include a first gate line and a second gate line, the first pixel being electrically connected with the first gate line, the second pixel being electrically connected with the second gate line, and the first and second pixels being electrically connected with a same data line, wherein the first pixel is configured to, under a control of the first gate line, create a first liquid crystal prism according to amplitude of data voltage input through the data line, so as to control light emergent direction at a position where the first pixel is located, and the second pixel is configured to, under a control of the second gate line, create a second liquid crystal prism according to amplitude of data voltage input through the data line, so as to control light emergent direction at a position where the second pixel is located.

Optionally, the first and second pixels in each display area are arranged in a column direction, first pixels in a same row are connected with a same first gate line, second pixels in a same row are connected with a same second gate line, and the first and second pixels in a same column are connected with a same data line.

Optionally, the display panel further includes an auxiliary strip electrode arranged between the strip electrodes of at least one of the first pixel and the second pixel.

Optionally, the strip electrode and the auxiliary strip electrode are arranged in a same layer and made of a same material.

Optionally, an extending direction of a bottom surface of a liquid crystal prism created in a pixel is perpendicular to an extending direction of the strip electrode in the pixel.

Optionally, the created liquid prisms are each a right-angle liquid crystal prism.

Optionally, the liquid crystal panel further includes a first substrate and a second substrate opposite to each other, a liquid crystal layer arranged between the first substrate and the second substrate, and a polarizer arranged at a light incident surface side of the second substrate.

Optionally, the display panel further includes a light splitting film arranged at a light incident surface side of the polarizer.

An embodiment of the present disclosure provides a driving method of a display panel, the display panel being any one of the above described display panels, and the driving method includes: a single view display stage, in which a gate scan signal is input to the gate line connected with at least one of the pixels having different domain tilt directions in each display area and a data voltage signal is input to the data line, such that at least one pixel in each display area performs display; and a multiple view display stage, in which gate scan signals are successively input to gate lines connected with the pixels having different domain tilt directions in each display area and data voltage signals are successively input to the data line, such that the pixels having different domain tilt directions in each display area successively perform displays.

An embodiment of the present disclosure provides a display apparatus including any one of the above described display panels.

Optionally, the display apparatus further includes a backlight arranged at a light incident surface side of the display panel, the backlight being configured to provide collimated light for the display panel.

According to the display panel in embodiments of the present disclosure, for each display area, pixels having different domain tilt directions are electrically connected with different gate lines, and strip electrodes in the pixels having different domain tilt directions have different tilt directions. Although the data voltages provided, through the data line, to the strip electrodes in each of the pixels in a same display area are the same, the directions of the liquid crystal prisms (i.e., the extending directions of the bottom surfaces of the liquid crystal prisms) created in the pixels having different domain tilt directions are different. Thus, the display panel according to embodiments of the present disclosure is capable of performing single view display at a specific view angle or multiple view display at different view angles.

DETAILED DESCRIPTION

To make a person skilled in the art better understand the technical solutions of the present invention, the present invention will be described in detail in conjunction with the accompanying drawings and specific embodiments.

Figure 1:
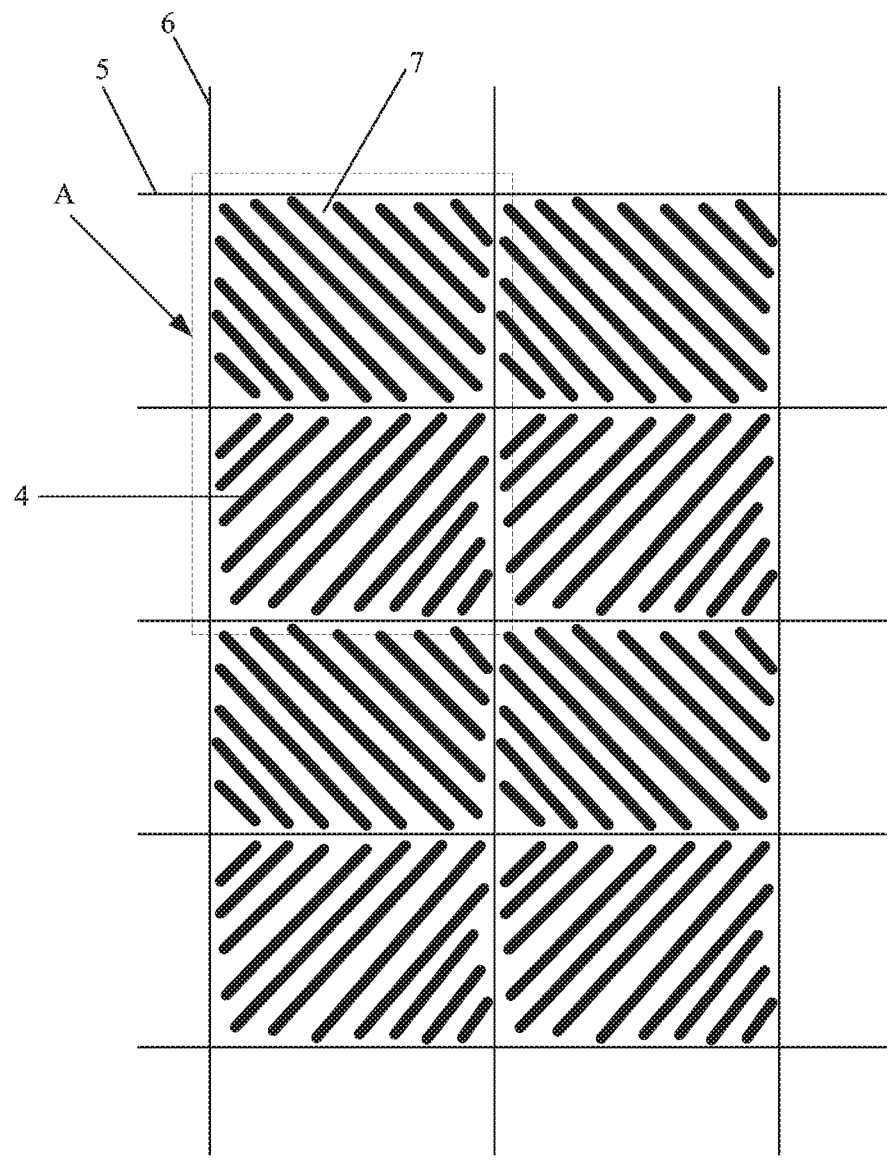
FIG. 1 is a schematic plan view illustrating a display panel according to an embodiment of the present disclosure.
Figure 2:
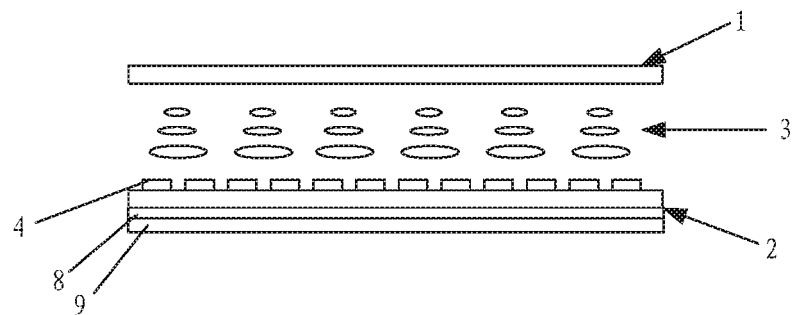
FIG. 2 is a schematic structural illustrating a display panel according to an embodiment of the present disclosure.

As shown in FIGS. 1 and 2, an embodiment of the present disclosure provides a multi-domain display panel including a plurality of display areas A arranged in form of an array. Each display area A includes at least two pixels 7 having different domain tilt directions and strip electrodes 4 in the pixels 7 having different domain tilt directions have different tilt directions. The pixels 7 having different domain tilt directions in each display area A are electrically connected with different gate lines 5, and the pixels 7 in a same display area A are electrically connected with a same data line 6. Each pixel 7 is configured to, under a control of the gate line 5 electrically connected with the pixel 7, create a corresponding liquid crystal prism according to amplitude of data voltage input through the data line 6, so as to control light emergent direction at a position where the pixel 7 is located. Specifically, each pixel 7 has liquid crystal molecules arranged therein, and the liquid crystal molecules create the liquid crystal prism when the strip electrodes 4 are applied with the data voltage.

According to the display panel of the present embodiment, for each display area A, the pixels 7 having different domain tilt directions are electrically connected with different gate lines 5, that is, the pixels 7 having different domain tilt directions are controlled by different gate lines 5. Thus, when a gate scan signal is input to the gate line 5, a corresponding pixel 7 may create a corresponding liquid crystal prism, and because the strip electrodes 4 in the pixels 7 having different domain tilt directions have different tilt directions, although the data voltages provided, through the data line 6, to the strip electrodes 4 in each of the pixels 7 in a same display area A are the same, the directions of the liquid crystal prisms (i.e., the extending directions of the bottom surfaces of the liquid crystal prisms) created in the pixels 7 having different domain tilt directions are different.

When a gate scan signal is input to a gate line 5 connected with a pixel 7 having one of the domain tilt directions in each display area A, a data voltage signal is input to a data line 6 connected with the pixel 7, such that the display panel may realize a single view display in a specific direction (that is, at a specific view angle).

When gate scan signals are input to respective gate lines 5 for each display area A, a data voltage signal is input to a data line 6. Because directions of liquid crystal prisms created in the pixels 7 having different domain tilt directions are different, the display panel may realize a single view display in each of multiple specific directions (that is, at each of multiple specific view angles), thereby the view displays can be viewed by several persons.

When a gate scan signal is input to a gate line 5 connected with a pixel 7 having one of the domain tilt directions in each display area A, a data voltage signal (a first data voltage signal) is input to a data line 6 connected with the pixel 7, and then, when gate scan signals are successively input to gate lines 5 connected with pixels 7 having other domain tilt directions in each display area A, data voltage signals (a second data voltage signal, a third data voltage signal . . . ) are successively input to the data line 6 connected with the pixels 7. Because directions of liquid crystal prisms created in the pixels 7 having different domain tilt directions are different, the display panel may display views corresponding to different data voltages at different view angles, that is, the display panel performs multiple view display.

The display panel provided in the present embodiment is capable of performing a single view display at a specific angle or a multiple view display at a plurality of different view angles.

In the present embodiment, an extending direction of a bottom surface of a liquid crystal prism created in each pixel 7 in the display panel has a certain inclined angle with respect to an extending direction of a strip electrode 4 in the pixel 7. For example, an extending direction of a bottom surface of a created liquid crystal prism is perpendicular to an extending direction of a strip electrode 4 of a corresponding pixel 7. In this case, a spatial profile of light can be controlled accurately, such that grayscale effect can be controlled.

In the present embodiment, the liquid crystal prism created in each pixel 7 in the display panel is a right-angle liquid crystal prism. In this case, collimated light is refracted towards a direction through the right-angle liquid crystal prism and reaches eyes of a viewer. Needless to say, the liquid crystal prism created in each pixel 7 is not limited to be a right-angle liquid crystal prism. The refraction direction caused by a liquid crystal prism is related to a direction of the liquid crystal prism, and therefore the direction of the created liquid crystal prism may be controlled by a viewer, in which the direction of the liquid crystal prism is related to amplitude of data voltage applied to the strip electrode 4.

As shown in FIG. 2, the display panel in the present embodiment includes a first substrate 1, a second substrate 2, and a liquid crystal layer 3 arranged therebetween. The first substrate 1 may be a color filter substrate, and the second substrate 2 may be an array substrate. Alternatively, the first substrate 1 may be a counter substrate, and the second substrate 2 may be an array substrate. In the present embodiment, the first substrate 1 is a counter substrate, and the second substrate 2 is an array substrate, for example. In this case, a polarizer 8 is arranged at a light incident surface side of the array substrate, a light splitting film 9 is arranged at a light incident surface side of the polarizer 8, and the light splitting film 9 is configured to split light emitted from a backlight into light of three colors of red, green and blue. In this case, it is not necessary to arrange color filters in the display panel, and only a lower polarizer 8 is needed in addition to omission of an upper polarizer, thereby achieving a lighter display panel.

An embodiment of the present disclosure further provides a driving method of the above display panel, and the method includes a single view display stage, in which a gate scan signal is input to a gate line 5 connected with at least one of the pixels 7 having different domain tilt directions in each display area A and a data voltage signal is input to a data line 6, such that at least one pixel 7 in each display area A performs display; and a multiple view display stage, in which gate scan signals are successively input to gate lines 5 connected with the pixels 7 having different domain tilt directions in each display area A and data voltage signals are successively input to a data line 6, such that the pixels 7 having different domain tilt directions in each display area A successively perform displays.

In the single view display stage, when a gate scan signal is input to a gate line 5 connected with a pixel 7 having one of the domain tilt directions in each display area A, a data voltage signal is input to a data line 6 connected with the pixel 7, such that the display panel may realize a single view display in a specific direction (that is, at a specific view angle). When gate scan signals are input to respective gate lines 5 for each display area A, a data voltage signal is input to a data line 6. Because directions of liquid crystal prisms created in the pixels 7 having different domain tilt directions are different, the display panel may realize a single view display in each of multiple specific directions (that is, at each of multiple specific view angles), thereby single view displays can be viewed by several persons.

In multiple view display stage, when a gate scan signal is input to a gate line 5 connected with a pixel 7 having one of the domain tilt directions in each display area A, a data voltage signal (a first data voltage signal) is input to a data line 6 connected with the pixel 7, and then, when scan signals are successively input to gate lines 5 connected with pixels 7 having other domain tilt directions in each display area A, data voltage signals (a second data voltage signal, a third data voltage signal . . . ) are successively input to the data line 6 connected with the pixels 7. Because directions of liquid crystal prisms created in the pixels 7 having different domain tilt directions are different, the display panel may display views corresponding to different data voltages at different view angles, that is, the display panel performs a multiple view display.

The driving method of the display panel provided in the present embodiment is capable of realizing a single view display at a specific view angle or a multiple view display at a plurality of different view angles.

Figure 3:
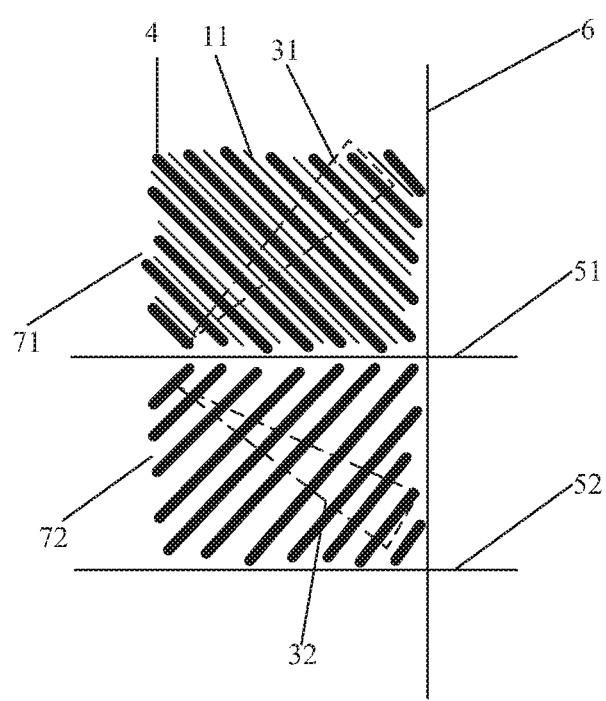
FIG. 3 is a schematic plan view illustrating a display panel according to an embodiment of the present disclosure.

As shown in FIG. 3, another embodiment of the present disclosure provides a dual-domain display panel, which includes a plurality of display areas A arranged in form of an array, and each display area A includes a first pixel 71 and a second pixel 72 arranged in a column direction and having different domain tilt directions. The display panel further includes a plurality of gate lines 5 and a plurality of data lines 6 crossing over each other, and the plurality of gate lines 5 includes a plurality of first gate lines 51 and a plurality of second gate lines 52. The first pixels 71 in a same row are electrically connected with a same first gate line 51, and the second pixels 72 in a same row are electrically connected with a same second gate line 52. The first pixels 71 and the second pixels 72 in a same column are electrically connected with a same data line 6. The first pixel 71 is configured to, under a control of the first gate line 51, create a first liquid crystal prism 31 according to amplitude of data voltage input through the data line 6, so as to control light emergent direction at a position where the first pixel 71 is located. The second pixel 72 is configured to, under a control of the second gate line 52, create a second liquid crystal prism 32 according to amplitude of data voltage input through the data line 6, so as to control light emergent direction at a position where the second pixel 72 is located.

In the display panel of the present embodiment, since the first pixel 71 and the second pixel 72 in each display area A have different domain tilt directions, the tilt directions of the strip electrodes 4 in the first pixel 71 and the second pixel 72 are different. Although the first pixel 71 and the second pixel 72 in each display area A are connected with a same data line 6 and the input data voltage signals are the same, the first liquid crystal prism 31 and the second liquid crystal prism 32 created in the first pixel 71 and the second pixel 72 are the same in shape but different in direction (i.e., extending direction of bottom surface of the liquid crystal prism) due to different tilt directions of the strip electrodes 4 in the first pixel 71 and the second pixel 72. In this case, light is transmitted towards a first direction when being refracted by the first liquid crystal prism 31, and light is transmitted towards a second direction when being refracted by the second liquid crystal prism 32.

When driving the display panel of the present embodiment, a method including a single view display stage and a dual-view display stage may be employed.

In the single view display stage, when a gate scan signal is input to the first gate line 51 connected with the first pixel 71, a data voltage signal is input to the data line 6, such that the display panel may perform a single view display in a first direction. Similarly, when a gate scan signal is input to the second gate line 52 connected with the second pixel 72, a data voltage signal is input to the data line 6, such that the display panel may perform a single view display in a second direction. Alternatively, when gate scan signals are simultaneously input to the first gate line 51 connected with the first pixel 71 and the second gate line 52 connected with the second pixel 72, a data voltage signal is input to the data line 6, such that the display panel may perform a single view display in both the first direction and the second direction, thereby the single view displays can be viewed by viewers in both directions.

In the dual-view display stage, when a gate scan signal is input to the first gate line 51 connected with the first pixel 71, a first data voltage signal is input to the data line 6; and then, when a gate scan signal is input to the second gate line 52 connected with the second pixel 72, a second data voltage is input to the data line 6. As such, the display panel performs a first view display in a first direction, and then the display panel performs a second view display in a second direction, thereby realizing a dual-view display.

In the present embodiment, the extending directions of the bottom surfaces of the liquid crystal prisms 31 and 32 created in the pixels 7 in the display panel have certain inclined angles with respect to the extending directions of the strip electrodes 4 in the pixels 7. For example, an extending direction of a bottom surface of a created liquid crystal prism is perpendicular to an extending direction of a strip electrode 4 of a corresponding pixel 7. In this case, a spatial profile of light can be controlled accurately, such that grayscale effect can be controlled.

In the present embodiment, the first liquid crystal prism 31 and the second liquid crystal prism 32 created in the pixels 7 in the display panel are right-angle liquid crystal prisms, this case, collimated light is refracted towards a direction through the right-angle liquid crystal prism and reaches eyes of a viewer. Needless to say, the liquid crystal prisms created in the pixels 7 are not limited to be a right-angle liquid crystal prism. The refraction direction caused by a liquid crystal prism is related to a direction of the liquid crystal prism, and therefore the direction of the created liquid crystal prism may be controlled by a viewer, in which the direction of the liquid crystal prism is related to amplitude of data voltage applied to the strip electrode 4.

In the present embodiment, an auxiliary strip electrode 11 is arranged between the strip electrodes 4 of at least one of the first pixel 71 and the second pixel 72.

In the present embodiment, the strip electrodes 4 of the first pixel 71 and the second pixel 72 in each display area A are different in tilt directions, but driven by a same data voltage signal, so the variety of combinations of the first pixel 71 and the second pixel 72 is limited compared to individually controlled pixels 7. In this case, the auxiliary strip electrode 11 is provided for assisting in adjustment. For example, the auxiliary strip electrode 11 and the strip electrode 4 are arranged in a same layer and made of a same material. That is, these two structures are formed by using a single patterning process, thereby reducing the cost. For example, these two structures may be arranged in different layers, or may be made of different materials.

The display panel in the present embodiment includes a first substrate 1, a second substrate 2, and a liquid crystal layer 3 arranged therebetween. The first substrate 1 may be a color filter substrate, and the second substrate 2 may be an array substrate. Alternatively, the first substrate 1 may be a counter substrate, and the second substrate 2 may be an array substrate. In the present embodiment, the first substrate 1 is a counter substrate, and the second substrate 2 is an array substrate, for example. In this case, a polarizer 8 is arranged at a light incident surface side of the array substrate, a light splitting film 9 is arranged at a light incident surface side of the polarizer 8, the light splitting film 9 is configured to split light emitted from a backlight into light of three colors of red, green and blue. In this case, it is not necessary to arrange color filters in the display panel, and only a lower polarizer 8 is needed in addition to omission of an upper polarizer, thereby achieving a lighter display panel.

Figure 4:
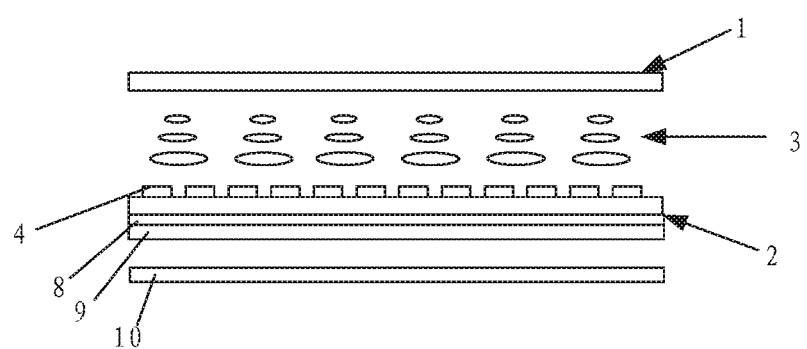
FIG. 4 is a schematic structural view illustrating a display apparatus according to an embodiment of the present disclosure.

Another embodiment of the present disclosure provides a display apparatus, which includes any one of the display panels described in the above embodiments and a backlight 10 arranged at a light incident surface side of the display panel. As shown in FIG. 4, the backlight 10 is configured to provide collimated light for the display panel.

The display panel of the present embodiment may be any product or component with display function such as a liquid crystal panel, an electronic paper, a mobile phone, a tablet computer, a television, a monitor, a laptop computer, a digital photo frame, a navigator or the like.

It can be understood that the foregoing implementations are merely exemplary embodiments used for describing the principle of the present invention, but the present invention is not limited thereto. Those of ordinary skill in the art may make various variations and improvements without departing from the spirit and essence of the present invention, and these variations and improvements shall also fall into the protection scope of the present invention.

What is claimed is:

1. A display panel comprising a plurality of display areas arranged in form of an array, each display area comprising at least two pixels having different domain tilt directions, and strip electrodes in the pixels having different domain tilt directions having different tilt directions, wherein
    the pixels having different domain tilt directions in each display area are electrically connected with different gate lines, and the pixels in each display area are electrically connected with a same data line, and
    each pixel is configured to drive, under a control of the gate line electrically connected with the pixel, liquid crystal molecules in the pixel to create a corresponding liquid crystal prism according to amplitude of data voltage input through the data line, so as to control light emergent direction at a position where the pixel is located,
    wherein the created liquid prisms are each a right-angle liquid crystal prism.

2. The display panel according to claim 1, wherein the pixels in each display area comprise a first pixel and a second pixel having different domain tilt directions, and the gate lines comprise a first gate line and a second gate line, the first pixel being electrically connected with the first gate line, the second pixel being electrically connected with the second gate line, and the first and second pixels being electrically connected with a same data line, wherein
    the first pixel is configured to, under a control of the first gate line, create a first liquid crystal prism according to amplitude of data voltage input through the data line, so as to control light emergent direction at a position where the first pixel is located; and
    the second pixel is configured to, under a control of the second gate line, create a second liquid crystal prism according to amplitude of data voltage input through the data line, so as to control light emergent direction at a position where the second pixel is located.

3. The display panel according to claim 1, wherein the first and second pixels in each display area are arranged in a column direction, first pixels in a same row are connected with a same first gate line, second pixels in a same row are connected with a same second gate line, and the first and second pixels in a same column are connected with a same data line.

4. The display panel according to claim 2, further comprising an auxiliary strip electrode arranged between the strip electrodes of at least one of the first pixel and the second pixel.

5. The display panel according to claim 4, wherein the strip electrode and the auxiliary strip electrode are arranged in a same layer and made of a same material.

6. The display panel according to claim 1, wherein an extending direction of a bottom surface of a liquid crystal prism created in a pixel is perpendicular to an extending direction of the strip electrode in the pixel.

7. The display panel according to claim 1, further comprising
    a first substrate and a second substrate opposite to each other;
    a liquid crystal layer arranged between the first substrate and the second substrate; and
    a polarizer arranged at a light incident surface side of the second substrate.

8. The display panel according to claim 7, further comprising a light splitting film arranged at a light incident surface side of the polarizer.

9. A display apparatus, comprising the display panel according to claim 1.

10. The display apparatus according to claim 9, wherein the pixels in each display area comprise a first pixel and a second pixel having different domain tilt directions, and the gate lines comprise a first gate line and a second gate line, the first pixel being electrically connected with the first gate line, the second pixel being electrically connected with the second gate line, and the first and second pixels being electrically connected with a same data line, wherein the first pixel is configured to, under a control of the first gate line, create a first liquid crystal prism according to amplitude of data voltage input through the data line, so as to control light emergent direction at a position where the first pixel is located; and the second pixel is configured to, under a control of the second gate line, create a second liquid crystal prism according to amplitude of data voltage input through the data line, so as to control light emergent direction at a position where the second pixel is located.

11. The display apparatus according to claim 10, wherein the first and second pixels in each display area are arranged in a column direction, first pixels in a same row are connected with a same first gate line, second pixels in a same row are connected with a same second gate line, and the first and second pixels in a same column are connected with a same data line.

12. The display apparatus according to claim 9, further comprising a backlight arranged at a light incident surface side of the display panel, wherein the backlight is configured to provide collimated light for the display panel.

13. A driving method of a display panel, the display panel comprising a plurality of display areas arranged in form of an array, each display area comprising at least two pixels having different domain tilt directions, and strip electrodes in the pixels having different domain tilt directions having different tilt directions, the pixels having different domain tilt directions in each display area being electrically connected with different gate lines, the pixels in each display area are electrically connected with a same data line, each pixel being configured to drive, under a control of the gate line electrically connected with the pixel, liquid crystal molecules in the pixel to create a corresponding liquid crystal prism according to amplitude of data voltage input through the data line, so as to control light emergent direction at a position where the pixel is located, the created liquid prisms each being a right-angle liquid crystal prism, the driving method comprising:

a single view display stage, in which a gate scan signal is input to the gate line connected with at least one of the pixels having different domain tilt directions in each display area and a data voltage signal is input to the data line, such that at least one pixel in each display area performs a display to display a single view at a specific view angle;

a multiple view display stage, in which gate scan signals are input to gate lines connected with the pixels having different domain tilt directions in each display area and the data voltage signal is input to the data line, such that the pixels in each display area perform a display to display multiple single views at multiple specific view angles, respectively, and the multiple view display stage comprising: successively inputting gate scan signals to gate lines connected with the pixels having different domain tilt directions in each display area and successively inputting data voltage signals to the data line, such that the pixels having different domain tilt directions in each display area successively perform displays to display, at multiple specific view angles views corresponding to different data voltages.

14. The driving method according to claim 13, wherein the pixels in each display area comprise a first pixel and a second pixel having different domain tilt directions, and the gate lines comprise a first gate line and a second gate line, the first pixel being electrically connected with the first gate line, the second pixel being electrically connected with the second gate line, and the first and second pixels being electrically connected with a same data line, wherein the first pixel is configured to, under a control of the first gate line, create a first liquid crystal prism according to amplitude of data voltage input through the data line, so as to control light emergent direction at a position where the first pixel is located; and the second pixel is configured to, under a control of the second gate line, create a second liquid crystal prism according to amplitude of data voltage input through the data line, so as to control light emergent direction at a position where the second pixel is located.

15. The driving method according to claim 13, wherein the first and second pixels in each display area are arranged in a column direction, first pixels in a same row are connected with a same first gate line, second pixels in a same row are connected with a same second gate line, and the first and second pixels in a same column are connected with the same data line.

16. The driving method according to claim 14, wherein the display panel further comprises an auxiliary strip electrode arranged between the strip electrodes of at least one of the first pixel and the second pixel.

17. The driving method according to claim 16, wherein the strip electrode and the auxiliary strip electrode are arranged in a same layer and made of a same material.

18. The driving method according to claim 13, wherein an extending direction of a bottom surface of the liquid crystal prism created in a pixel is perpendicular to an extending direction of the strip electrode in the pixel.

19. The driving method according to claim 13, wherein the display panel further comprises:
a first substrate and a second substrate opposite to each other;
a liquid crystal layer arranged between the first substrate and the second substrate; and
a polarizer arranged at a light incident surface side of the second substrate.

20. The driving method according to claim 19, wherein the display panel further comprises a light splitting film arranged at a light incident surface side of the polarizer.

* * * * *